US006598001B1

(12) United States Patent
Deflandre

(10) Patent No.: US 6,598,001 B1
(45) Date of Patent: Jul. 22, 2003

(54) METHOD OF ANALYZING ACQUIRED SIGNALS FOR AUTOMATIC LOCATION THEREON OF AT LEAST ONE SIGNIFICANT INSTANT

(75) Inventor: Jean-Pierre Deflandre, Ermont (FR)

(73) Assignees: Gaz de France, Paris Cedex (FR); Institut Francais du Petrole, Rueil-Malmaison Cedex (FR)

( * ) Notice: Subject to any disclaimer, the term of this patent is extended or adjusted under 35 U.S.C. 154(b) by 232 days.

(21) Appl. No.: 09/624,911

(22) Filed: Jul. 24, 2000

(30) Foreign Application Priority Data

Jul. 28, 1999 (FR) .......................................... 99 09883

(51) Int. Cl.⁷ .......................... G01R 13/00; G06F 19/00
(52) U.S. Cl. .............................. 702/66; 704/258; 367/38
(58) Field of Search ............................... 702/14–18, 66, 702/69–71, 74, 183, 189; 367/14, 37, 38, 43, 45; 704/258, 265, 267, 268, 270, 274, 275, 278

(56) References Cited

U.S. PATENT DOCUMENTS

| 4,258,423 A | * | 3/1981 | Lane et al. ..................... 702/70 |
| 4,319,329 A | * | 3/1982 | Girgis et al. ................... 702/75 |
| 4,516,206 A | * | 5/1985 | McEvilly ....................... 702/18 |
| 4,794,543 A | * | 12/1988 | Enein et al. .................... 702/66 |
| 4,881,207 A | * | 11/1989 | Dubesset et al. ............. 367/31 |
| 5,179,518 A | * | 1/1993 | Keskes et al. ................. 702/14 |
| 5,278,805 A | * | 1/1994 | Kimball ........................ 367/32 |
| 5,426,618 A | * | 6/1995 | Chen et al. .................... 367/42 |
| 5,933,808 A | * | 8/1999 | Kang et al. ................... 704/278 |
| 5,937,078 A | * | 8/1999 | Hyland et al. ................ 382/103 |
| 5,991,237 A | * | 11/1999 | de Bazelaire ................. 367/50 |
| 6,049,508 A | * | 4/2000 | Deflandre .................... 367/48 |
| 6,191,571 B1 | * | 2/2001 | Fukui et al. ............. 324/76.26 |
| 6,263,290 B1 | * | 7/2001 | Williams et al. ............... 702/71 |

FOREIGN PATENT DOCUMENTS

| FR | 2614997 | 11/1988 | ............ G01V/1/28 |
| FR | 2650676 | 2/1991 | ............ G01V/1/28 |
| WO | 9903044 | 1/1999 | ............ G01V/1/36 |

OTHER PUBLICATIONS

Helffrich, "Heterogeneity and topography of the core–mantle boundary derived from SKS, SKKS, and PKS polarizations", Jan. 15, 1996, Science, p. 2.*
Ervin, C. P. et al: "Automated Analysis of Marine Refraction data: a Computer Algorithm", appearing in GEOPHYSICS, May 1983, USA, vol. 48, No. 5, pp. 582–589, XP002137888, ISSN: 0016–8033.

* cited by examiner

Primary Examiner—Marc S. Hoff
Assistant Examiner—Mary Catherine Baran
(74) Attorney, Agent, or Firm—Antonelli, Terry, Stout & Kraus, LLP

(57) ABSTRACT

A method for automatic analysis of signals acquired by one or more elastic or acoustic wave pickups to automatically locate with high precision, at least one significant instant such as the time of first arrival on each pickup ($t_i$) and/or the end time ($t_f$) of these signals. The method comprises determining the pseudoperiod corresponding to the inverse of the dominant frequency of the frequency spectrum of each acquired signal, coding each acquired signal so as to form a binary coded signal in reference to a first threshold value depending on the acquired signal, forming for each of them an integral signal by stacking of the binary coded signal on a sliding window in order to determine a second threshold value, and positioning the significant instant sought ($t_i$, $t_f$) on each acquired signal in reference to an instant where the corresponding integral signal reaches this second threshold value.

30 Claims, 5 Drawing Sheets

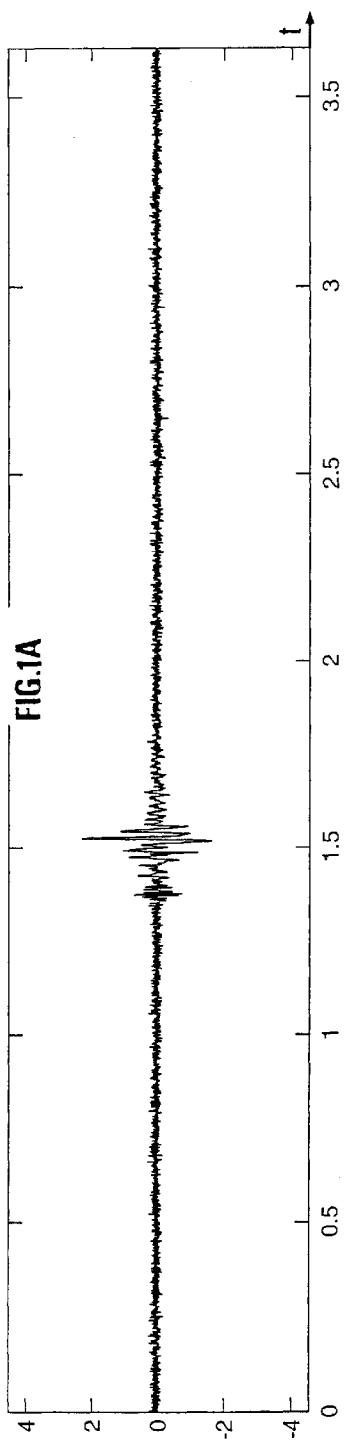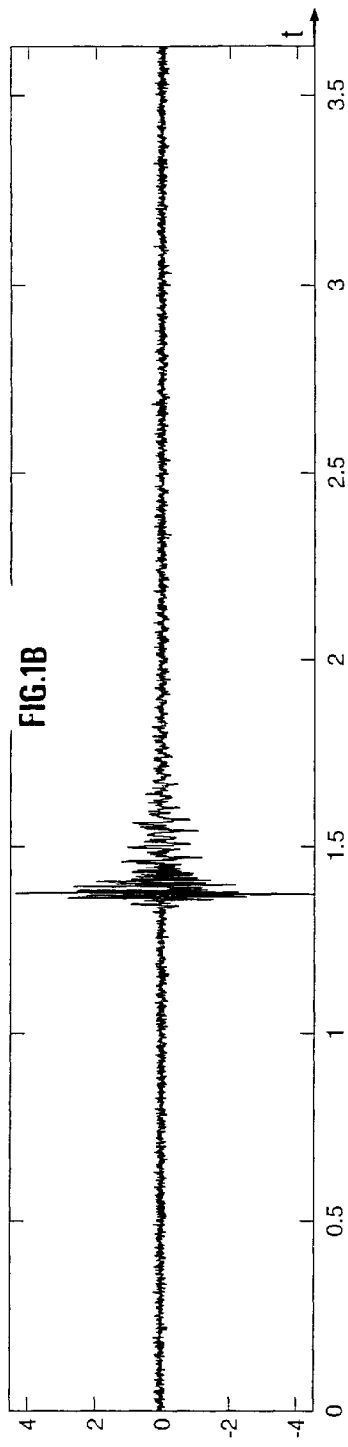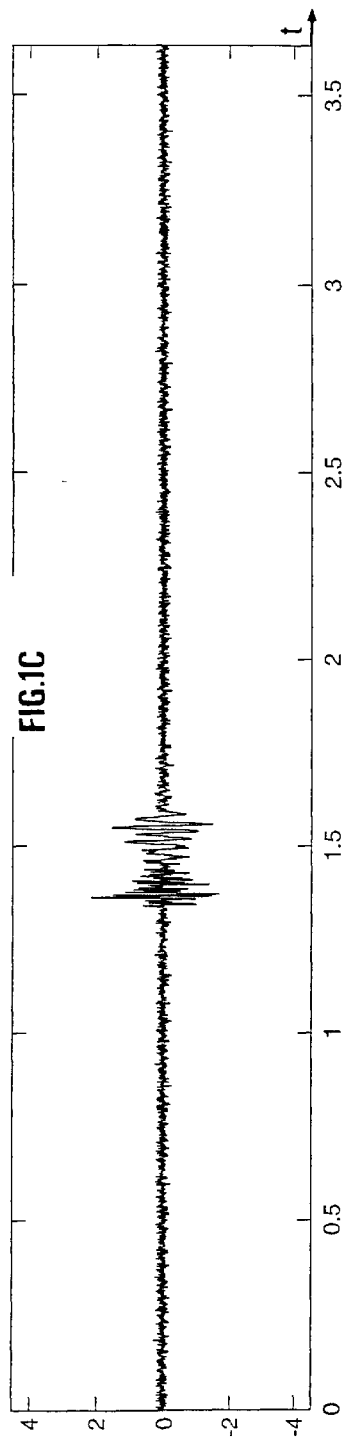

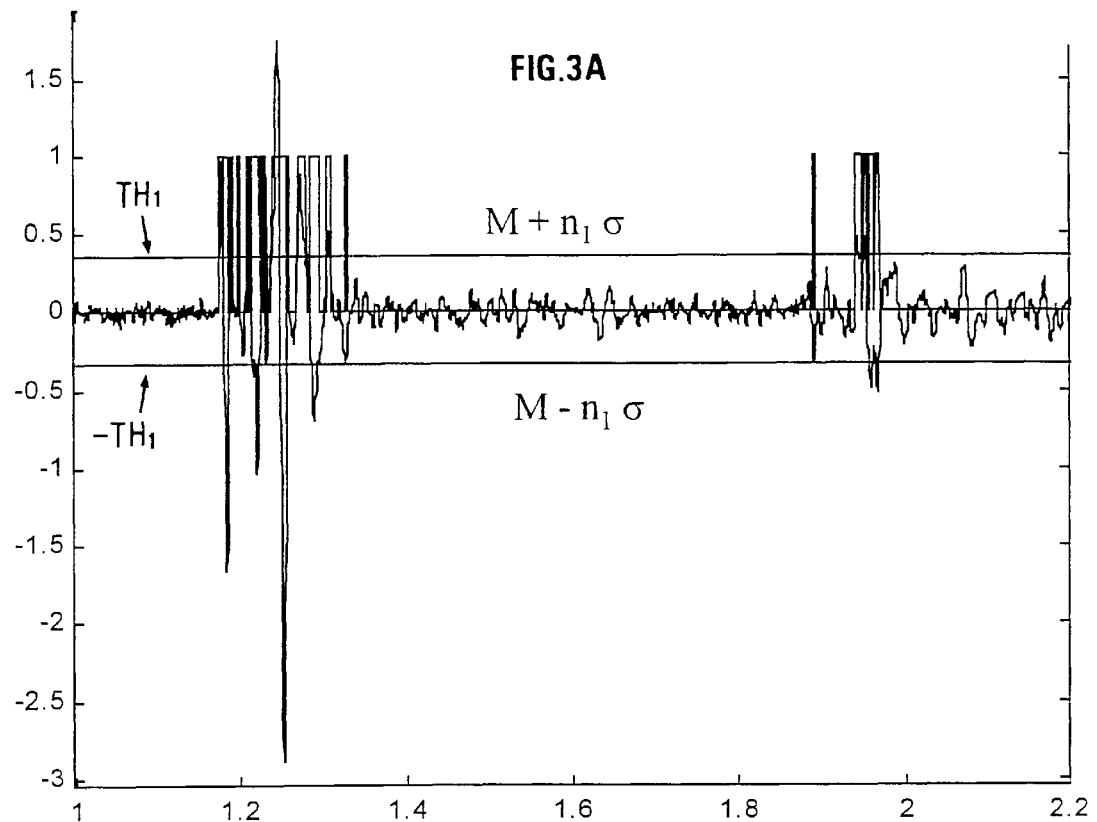
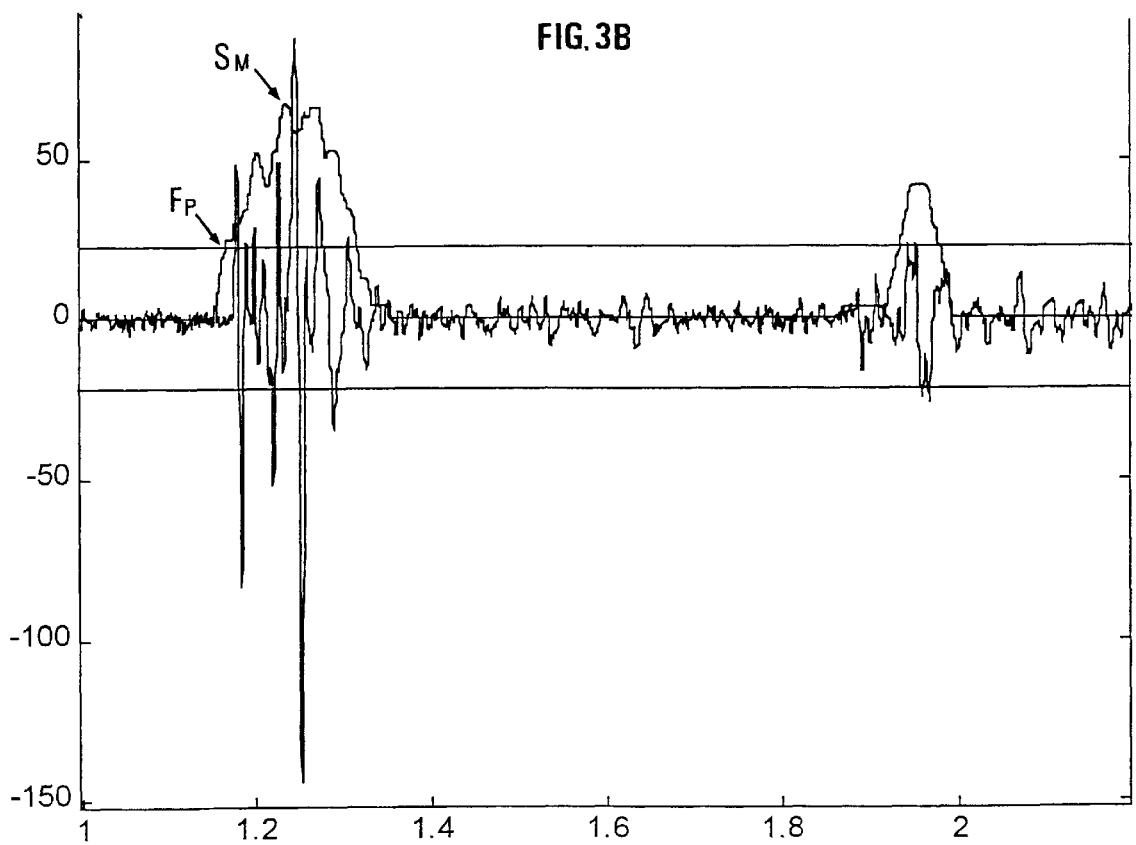

METHOD OF ANALYZING ACQUIRED SIGNALS FOR AUTOMATIC LOCATION THEREON OF AT LEAST ONE SIGNIFICANT INSTANT

FIELD OF THE INVENTION

Background of the Invention

The present invention relates to a method of analyzing signals received by elastic wave pickups for automatically locating, with high precision, significant instants such as the time of first arrival at the various pickups and/or the end times of these signals.

U.S. Pat. Nos. 4,775,009, 5,303,773, and 5,370,545 notably describe various techniques for monitoring the evolution in time of underground reservoirs using seismic or other pickups permanently installed in one or more wells, without disturbing the various operations in progress (fluid production or injection, various servicing operations carried out by means of these wells). Permanent installation of these pickups in wells allows seismic monitoring of a reservoir in order to detect various phenomena linked with the development thereof. Permanent seismic pickups are for example installed outside a casing that is lowered into the well. They are embedded in the cement that is normally injected into the annular space between the casing and the well and which provides proper coupling with the surrounding formations. The seismic pickups can also be fastened outside a string installed in a well during completion operations. They are associated with mobile devices suited to press them against the well casing and with decoupling devices for filtering the vibrations propagated along the string.

French Patents 2,703,457, 2,703,470 and 2,728,973 and U.S. Pat. No. 5,724,311 describe methods intended for long-term repetitive active monitoring of a reservoir by applying elastic waves to a formation and acquisition of the response signals reflected by the formation, by means of permanent installation of emission-reception devices in wells or in the vicinity of the ground surface. Differential processings are thus performed on acquisitions obtained under identical conditions.

French Patent 2,772,137 describes a method which simplifies problems of discrimination and identification of seismic or microseismic events relative to the development of an underground zone. One or more reference pickups are used, which are provided with a direct acoustic coupling with elements of the technical zone development equipment that can also detect waves directly linked with development. Comparative analysis of the signals coming from the various receivers and from each reference pickup allows sorting of the records into different families according to whether the events in the underground zone are independent of the events detected by each reference pickup or depend thereon directly or indirectly. A catalog of type events having a causal connection with development operations in the underground zone can be drawn up by correlation between the records of the signals received respectively by the receivers and the (or each) reference pickup, and the nature of the seismic or microseismic events can thus be identified.

Precise determination of the times of arrival of the signals received by several receivers coupled with the underground formation allows location of the points of emission (source points or origins) where events directly or indirectly are linked with an activity that modifies the stress field such as fluid injection or extraction operations through one or more wells.

This allows the site operator to quickly interpret the position data obtained in connection with the conventional production data (pressure, flow rate, temperature, etc.), so the operator can take into account the mechanical response of the site in the production protocol so as to preserve the productivity of the well(s) or of the site.

However, the most commonly used method for precisely detecting the significant instants of the signals received during seismic monitoring of an underground zone is the operator viewing all the records and locating the times (of first arrival) when the signals occur on all the pickups. Such an operation is long and tedious when large numbers of systematic records are obtained over a long period of time which require review.

SUMMARY OF THE INVENTION

The method according to the invention, which provides analysis of acquired signals coming from at least one wave pickup, allows automatic detection with high precision at least one significant instant of each signal such as the time of first arrival (ti) or the end time (tf) thereof which simplifies counting and sorting operations prior to interpretation.

The method of the invention has applications in many fields where the times of arrival of vibrational signals are to be located with high precision. This is notably the case within the scope of systems intended for active or passive seismic monitoring of underground reservoirs under development, generally used for fluid extraction or for fluid injection.

The method comprises:
  determining the pseudoperiod corresponding to an inverse of the dominant frequency of the frequency spectrum of at least part of each acquired signal;
  coding each acquired signal so as to form a binary coded signal in reference to a first threshold value depending on the acquired signal (coding to value 1 or 0 for example, according to whether its absolute value is above or below this threshold value);
  forming for each acquired signal an integral signal by stacking the binary coded signal on a sliding window so as to determine a second threshold value (preferably depending on the maximum amplitude of this integral signal); and
  positioning a significant instant of an acquired signal in reference to an instant where a corresponding integral signal reaches a second threshold value.
  In order to position the significant instant ($t_i$ or $t_f$) of each acquired signal, a first reference point is for example determined, where the amplitude of the corresponding integral signal is equal to the second threshold value, a first intermediate instant between the first reference point and a boundary that is the closest to the integral signal (the beginning, if the time of first arrival is sought) is detected, a second intermediate instant between the first intermediate instant and an opposite boundary of the integral signal (the end, with the same hypothesis) where the integral signal exceeds a third threshold value depending on the acquired signal is also detected. The significant instant sought is then located on the acquired signal at a quarter of a pseudoperiod of the second intermediate instant (upstream or downstream according to whether it is the time of first arrival or the end time of each acquired signal).

The time of first arrival of each acquired signal and the end time of each acquired signal can both be determined and parts recorded between these two instants can be isolated in the records of the signals received by each wave pickup.

All the recorded parts defined by various significant instants can also be isolated on a single acquired signal so as to detect all distinct arrivals at the same wave pickup.

The method can also comprise analyzing the signals respectively received by a plurality of wave pickups, relative to an event generating elastic signals, determining polarization of each acquired signal immediately after a time of first arrival and detecting successive arrivals of compressional waves and shear waves by comparing orientations of the eigenvectors linked with the respective polarizations of the signals.

The method can also comprise analyzing the acquired signals coming from a plurality of wave pickups, relative to an event generating these signals, determining polarization of each acquired signal immediately after a time of first arrival and detecting multiplets by comparing orientations of the eigenvectors linked with the respective polarizations of the signals.

The method according to the invention allows automatic detection of the arrival of a (notably seismic) wave with a very good precision. The method is therefore self-adaptive because it reaches its objective: evaluation of the dominant frequency of each acquired signal and use of the pseudoperiod corresponding to the dominant frequency to investigate an integral signal (binary coded and stacked) established from the unprocessed initial signal, thus taking into account a series of several parameters adjustable according to the local signal acquisition conditions, but depending on the signal itself.

The method therefore facilitates automatic location of the microseismic events having a succession of compressional and shear waves and, if these events are detected by a sufficient number of spaced out pickups, the method allows automatic triangulation from the times of arrival thus determined, the velocity model being known otherwise.

BRIEF DESCRIPTION OF THE DRAWINGS

Other features and advantages of the method according to the invention will be clear from reading the description hereafter of a non limitative example, with reference to the accompanying drawings wherein:

FIGS. 1a to 1c show an example of signals picked up respectively on the three components of a three-way geophone (referred to as triphone), FIGS. 2a to 2c respectively show the signals of FIG. 1 on a larger scale, FIG. 3a shows the binary coding, applied to a signal, to 1 or 0 according to whether it exceeds a threshold level or not, FIG. 3b shows the integral signal formed by stacking the coded signal of FIG. 3a on a sliding window, FIGS. 4a to 4c respectively show the integral signals formed from the signals of FIGS. 1a to 1c or 2a to 2c respectively, and FIGS. 5a to 5c respectively show the signals of FIGS. 2a to 2c where the respective first arrival (ti) and end (tf) times are automatically located.

DETAILED DESCRIPTION OF THE PREFERRED EMBODIMENTS

I) Preliminary Stages

I-1) Each signal is digitally acquired with a sufficient sampling frequency $f_{ech}$ (2400 Hz for instance in the present example) from an initial instant sufficiently preceding the possible first arrivals of low amplitude so as not to miss them (pre-triggering zone);

I-2) The signal acquired by each pickup is preferably filtered without dephasing thereof to keep only the frequency spectrum whose upper and lower limits <<fmin>> and <<fmax>> have been previously fixed (modifiable parameters fixed for example at 5 Hz and 300 Hz);

I-3) Each acquired signal is also preferably filtered by means of a parametered median filter MF in order to eliminate the parasitic peaks coming from the noise level and whose duration is close to the signal sampling period.

The previous two filtering operations are recommended but they are however optional.

I-4) The dominant frequency $_{Fdom1}$ in the signal is calculated by means of a well-known spectral analysis technique (FFT for example). If there are differences between the values of $F_{dom}$ obtained on the various ways of a three-component pickup, a mean value is determined. The corresponding pseudoperiod is deduced therefrom: $T_{PS}=1/F_{dom}$, which allows determination the number of sampling periods (points) np per pseudoperiod $T_{PS}$ of a signal: $np=f_{ech}/F_{dom}$.

II) Phases of Detection of the Time of First Arrival of a Wave

Figure 4A:
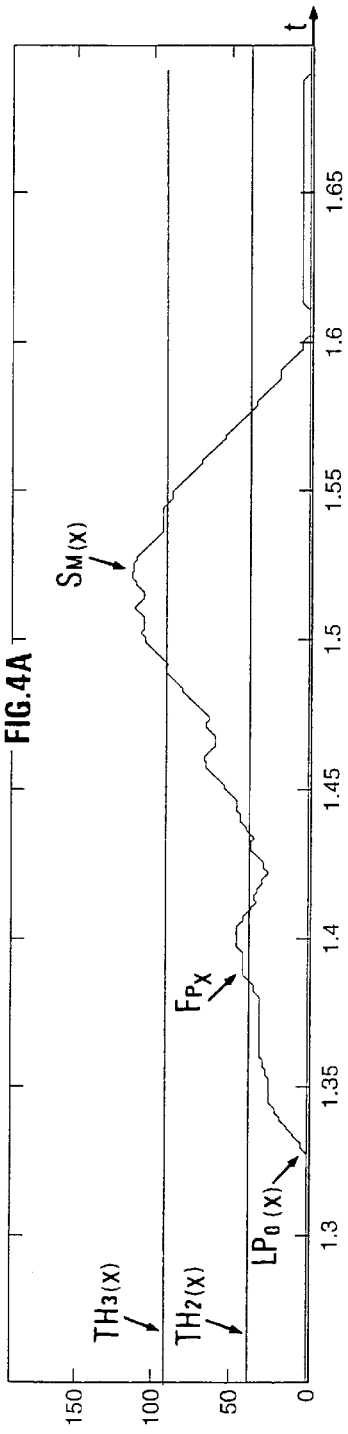
Figure 4B:
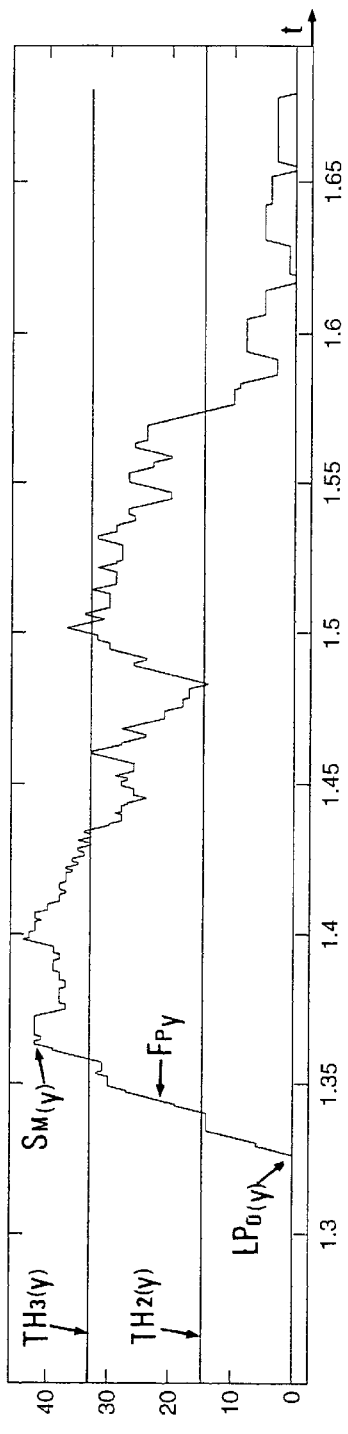
Figure 4C:
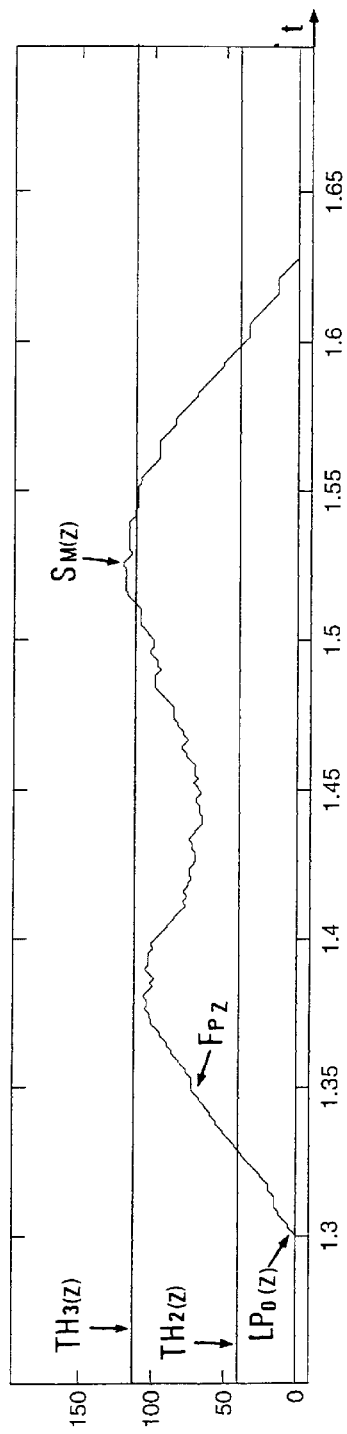
Figure 5A:
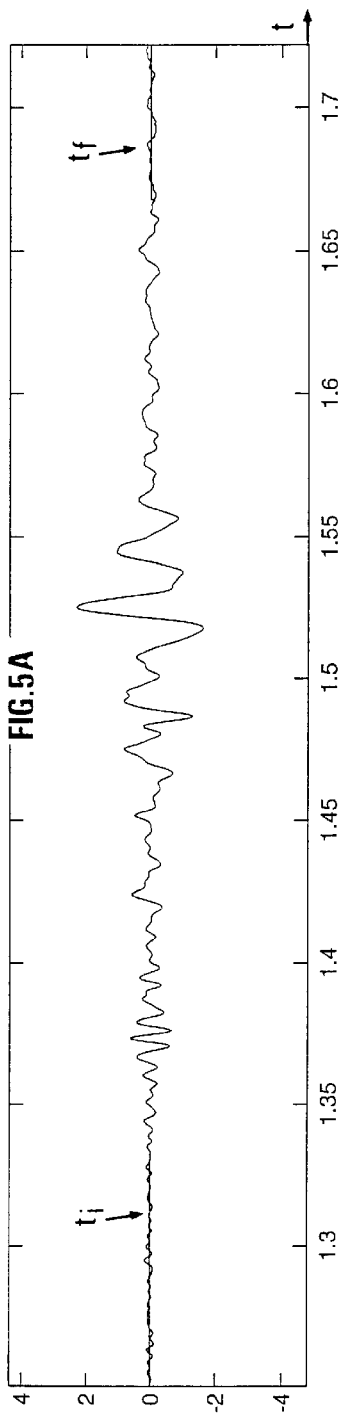
Figure 5B:
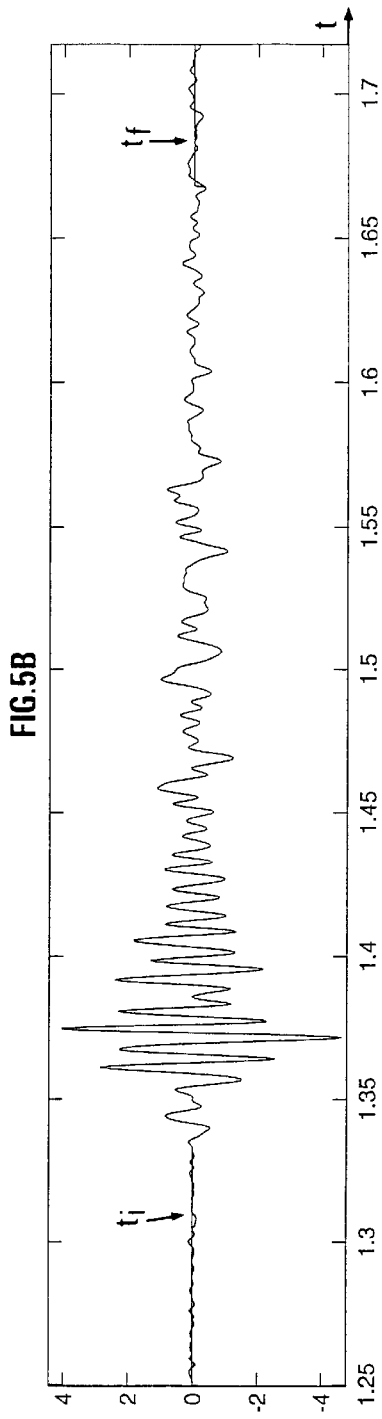
Figure 5C:
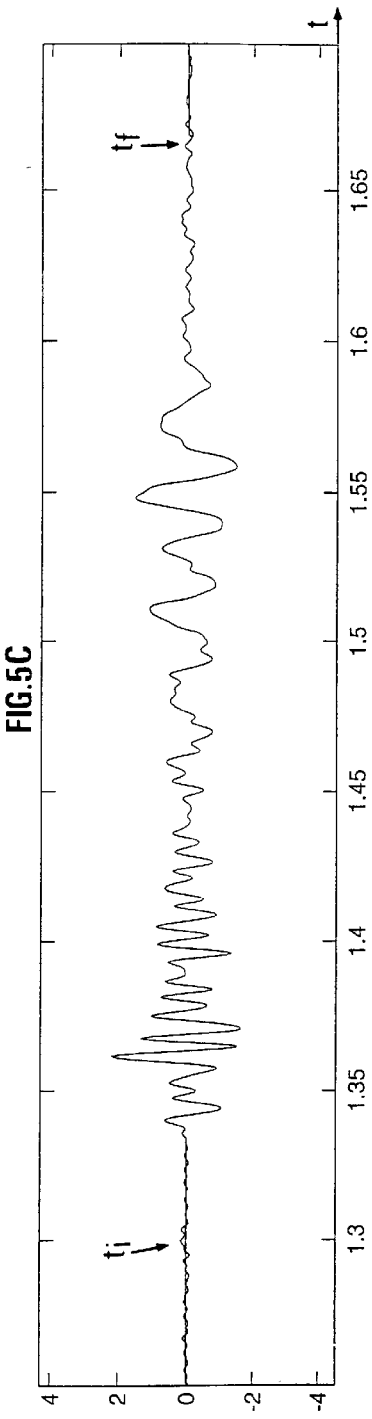

II-1) Calculation of the mean M and of the standard deviation σ on the signal acquired during pre-triggering on a window W of duration w.np, where w is an elementary duration that can be modified as wanted;

II-2) Formation of a binary coded signal $E_e$ (FIG. 3a) obtained by coding to 1 any signal sample whose level in absolute value is greater than or equal to a threshold value TH1: $M+n_1 \cdot \sigma$, and to 0 in the opposite case ($n_1$ being a coefficient that can be modified as wanted, equal to 6 in the present case);

II-3) Integration (FIGS. 3b, 4a to 4c) by stacking on a sliding window of width w.np of the non zero levels, with assignment of the value obtained in each window to the sample in the middle of the window considered, all the other samples of the window being assigned a value 0. S designates the signal formed by all the central samples of the successive sliding windows.

In order to reduce the calculating time, it is most often possible to increase the is sliding interval of the window without the results being substantially altered, II-4) After a relative threshold TH2 corresponding to the ratio of the maximum value $S_M$ of signal S (FIGS. 4a to 4c) to a previously set value $C_{S1}$ that can be modified (if need be) has been fixed for each component, a representative event is detected for each component by identifying the first point $F_P$ exceeding this threshold TH2. In the interval contained between the beginning of stacked coded signal S and point $F_P$, the last point $LP_0$ of zero value is sought for each component.

II-5) The time ti of first arrival of the signal is then determined by seeking, in the interval between $LP_0$ and the end of stacked coded signal S, on each component, the first maximum $S_M$ (FIGS. 4a to 4c) that exceeds a certain level equal to $(M+n_2 \cdot \sigma)$, where $n_2$ is, like $n_1$, a modifiable integer (equal to 7 in the present example). Time ti is then obtained by putting the signal back from this point by a quarter of a pseudoperiod, i.e. by np/4 sampling points. In the case of signals with three components, if the values determined for each way are different, a particular convention is applied to select the value of ti. In general, the lowest value is selected as a precautionary measure so as not to miss the first impulse in the signal.

II-6) The previous stages can be completed by identifying the polarity of the first movement.

Precise detection of the time of first arrival ti allows determination with a high reliability the polarity of the signal (positive or negative) immediately thereafter. If this polarity is known for a sufficient number of pickups that have recorded the event, a focal mechanism can be identified under certain hypotheses, notably identification of a well-known mechanism referred to as "double couple", as is known.

III) Phases of Detection of the End and of the Duration of the Signal

The detection algorithm described in the previous paragraph can be applied directly for detection of the time tf of the end of the signal by taking then the end of the signal as the reference.

Figure 2A:
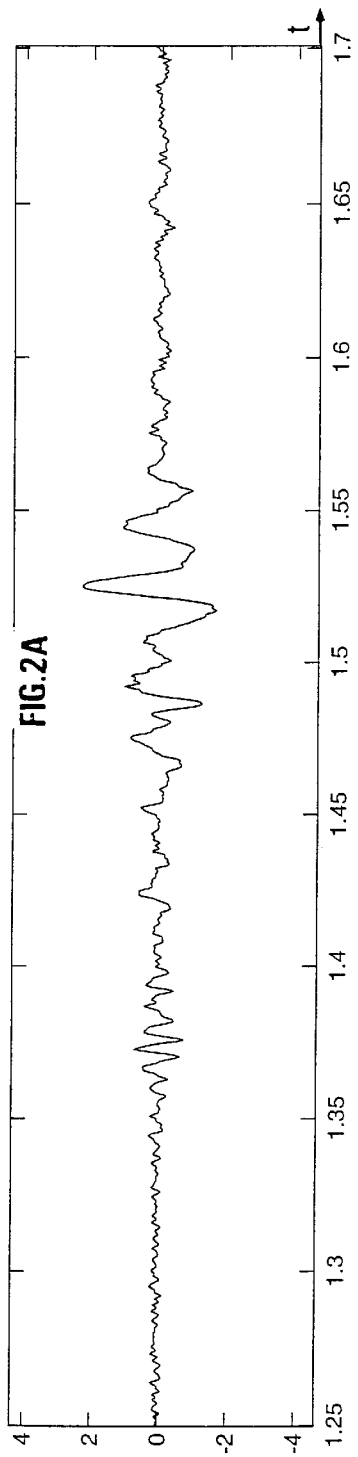
Figure 2B:
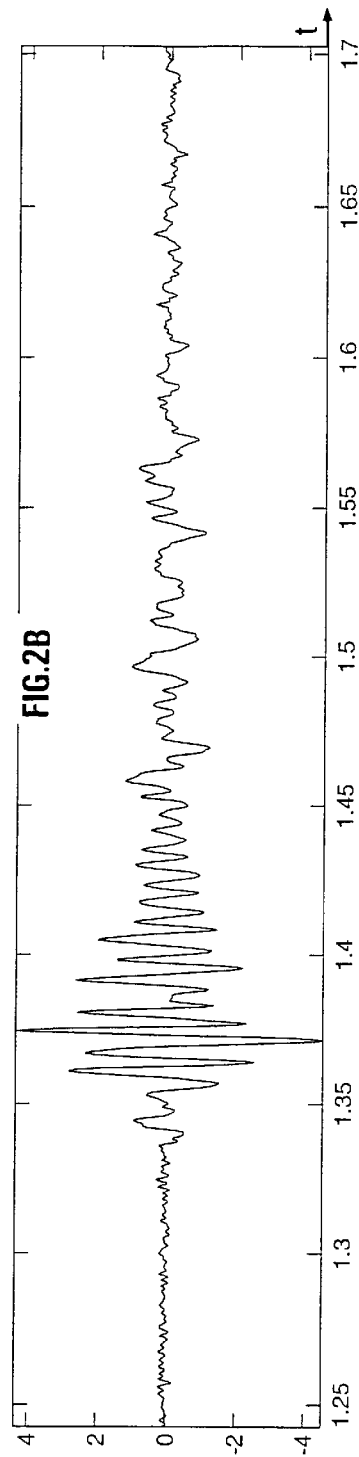
Figure 2C:
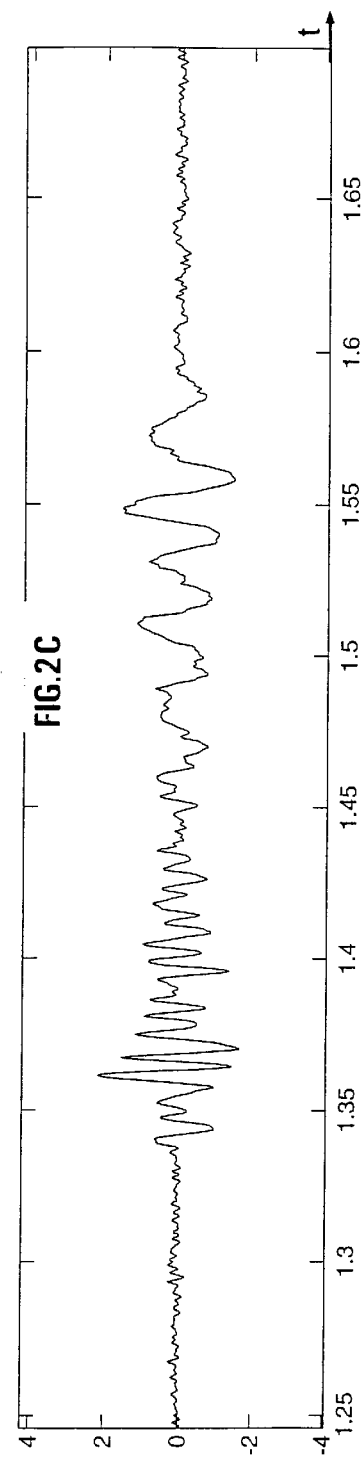

The duration of the signal can be calculated: $\Delta t = tf - ti$. The useful signal is extracted from the initial signal file (FIGS. 1a–1c or 2a–2c) in the interval contained between ti and tf, with the possibility of keeping a pre-triggering zone and a post-triggering zone whose widths can be proportional to the pseudoperiod of the signal.

IV) Identification of Distinct Multiple Arrivals in a Single Signal File

1) By locating the various zero value ranges of the stacked coded signal, distinct arrivals can be readily located and counted in a single signal file.

2) A polarization analysis can be carried out of each different arrival so as to determine for each one the eigenvectors defining the natural trihedron of each wave, with reference for example to that described in U.S. Pat. No. 4,881,207. Comparison of the orientations of these eigenvectors allows detection of possible successions of compressional and shear waves (in cases where the first eigenvectors of the two arrivals considered are orthogonal in relation to one another) or to study whether the signals correspond to multiplets (signals having similar signatures at the same reception point but acquired at different times).

The method has advantages. The method according to the invention thus essentially evaluates a dominant frequency of each acquired signal and uses the pseudoperiod corresponding to the dominant frequency to investigate a binary coded and stacked integral signal S established from the unprocessed initial signal. By means of a series of parameters such as w, $n_1$, $n_2$ and th1, adjustable according to the local signal acquisition conditions, detection can be refined for a particular data set (representative of a signal reception site for example). The method is self-adaptive because it takes into account signals acquired by means of values M, $\sigma$, $S_M$, $F_{dom}$, np (stages I-5, II-1 and II-4 notably).

The method of the invention allows automatic detection of the arrival of a seismic wave (or of any other nature) with a very high precision, and this precision can even be automatically improved by means of a polarization analysis after this detection, which is particularly useful when the beginning of the signal obscured in noise.

The method of the invention contributes to automatic location of microseismic events having a succession of compressional and shear waves.

Similarly, the method of the invention contributes to automatic location of seismic or microseismic events acquired from a sufficient number of sufficiently spaced out pickups (4 for example) by allowing automatic triangulation from the times of arrival thus determined with the velocity model being known otherwise.

The method of the invention contributes to automatic identification of the focal mechanisms when applied to a sufficient number of seismic pickups that have recorded a given event.

The method has been described in the field of the analysis of seismic or micro-seismic signals. It is within the scope of the invention to also use the method for detecting distinct successive signals in spoken words or speech.

What is claimed is:

1. A method of analysis of acquired signals coming from at least one wave sensor for automatically locating in each signal at least one instant, comprising:

determining a pseudoperiod corresponding to an inverse of a dominant frequency of a frequency spectrum of at least part of each acquired signal;

sampling each acquired signal and coding the acquired signal to form a binary coded signal with reference to a first threshold level from the acquired signal; and forming for each acquired signal an integral signal by stacking the binary coded signal on a sliding window to determine a second threshold level and positioning an instant of the acquired signal with reference to an instant when a corresponding level of the integral signal reaches the second threshold value.

2. A method as claim in claim 1, wherein a location of at least one instant of each acquired signal comprises:

determining a first reference point where the amplitude of the corresponding integral signal is equal to the second threshold value;

detecting a first intermediate instant between the first reference point and a boundary closest to the integral signal;

detecting a second intermediate instant between the first intermediate instant and an opposite boundary of the integral signal where a first maximum of the integral signal exceeds a third threshold value dependent upon the acquired signal; and locating the instant of the acquired signal at a quarter of a pseudoperiod of the second intermediate instant.

3. A method as claimed in claim 2, wherein instants are located in signals sensed by seismic sensors.

4. A method as claim in claim 2, wherein:

the instant is a time of first arrival of each acquired signal.

5. A method as claimed in claim 4, wherein:

instants are located in signals corresponding to spoken words.

6. A method as claimed in claim 4, wherein instants are located in signals sensed by seismic sensors.

7. A method as claimed in claim 2, wherein:

the instant is an end time of each acquired signal.

8. A method as claimed in claim 7, wherein:

instants are located in signals corresponding to spoken words.

9. A method as claimed in claim 7, wherein instants are located in signals sensed by seismic sensors.

10. A method as claim in claim 1, wherein:

the instant is a time of first arrival of each acquired signal.

11. A method as claimed in claim 10, wherein:

instants are located in signals corresponding to spoken words.

12. A method as claimed in claim 10, wherein instants are located in signals sensed by seismic sensors.

13. A method as claimed in claim 10, comprising:

analyzing signals received respectively by a plurality of wave sensors relative to a same event generating elastic signals;

determining polarization of each acquired signal after a time of first arrival thereof; and detecting successive arrivals of compressional waves and of shear waves by comparing orientations of eigenvectors linked with respective polarizations of the signals.

14. A method as claimed in claim 13, wherein:

instants are located in signals corresponding to spoken words.

15. A method as claimed in claim 13, wherein instants are located in signals sensed by seismic sensors.

16. A method as claimed in claim 10, comprising:

analyzing signals received respectively by a plurality of wave sensors relative to a same event generating elastic signals;

determining polarization of each acquired signal after a time of first arrival thereof; and detecting multiplets by comparing orientations of eigenvectors linked with the respective polarizations of the signals.

17. A method as claimed in claim 16, wherein:

instants are located in signals corresponding to spoken words.

18. A method as claimed in claim 16, wherein instants are located in signals sensed by seismic sensors.

19. A method as claimed in claim 1, wherein:

the instant is an end time of each acquired signal.

20. A method as claimed in claim 19, wherein:

instants are located in signals corresponding to spoken words.

21. A method as claimed in claim 19, wherein instants are located in signals sensed by seismic sensors.

22. A method as claimed in claim 1, comprising:

determining a time of first arrival of each acquired signal and an end time of each acquired signal and isolating parts recorded between the time of first arrival and the end time of the records of the signals received by each wave sensor.

23. A method as claimed in claim 22, wherein:

instants are located in signals corresponding to spoken words.

24. A method as claimed in claim 22, wherein instants are located in signals sensed by seismic sensors.

25. A method as claimed in claim 22, comprising:

isolating all recorded parts defined by the instants to detect identifiable arrivals at a single wave sensor.

26. A method as claimed in claim 25, wherein:

instants are located in signals corresponding to spoken words.

27. A method as claimed in claim 25, wherein instants are located in signals sensed by seismic sensors.

28. A method as claimed in claim 1, wherein:

instants are located in signals corresponding to spoken words.

29. A method as claimed in claim 2, wherein:

instants are located in signals corresponding to spoken words.

30. A method as claimed in claim 1, wherein instants are located in signals sensed by seismic sensors.

* * * * *